United States Patent
Yata et al.

(10) Patent No.: US 7,460,477 B2
(45) Date of Patent: Dec. 2, 2008

(54) ELECTRONIC APPARATUS WITH COMMUNICATION DEVICE

(75) Inventors: Koichi Yata, Hanno (JP); Tooru Homma, Kawaguchi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 10/795,974

(22) Filed: Mar. 10, 2004

(65) Prior Publication Data

US 2004/0240418 A1  Dec. 2, 2004

(30) Foreign Application Priority Data

Mar. 11, 2003  (JP) .............................. 2003-065410

(51) Int. Cl.
*H04L 12/26* (2006.01)

(52) U.S. Cl. ..................................... 370/232

(58) Field of Classification Search .............. 370/389, 370/252, 347, 280, 336, 223, 431, 412, 329, 370/335, 229, 230, 232, 310; 375/242, 262, 375/295; 709/241, 238, 239
See application file for complete search history.

(56) References Cited

U.S. PATENT DOCUMENTS

| | | | | |
|---|---|---|---|---|
| 6,163,577 | A * | 12/2000 | Ekudden et al. | 375/242 |
| 6,385,183 | B1 * | 5/2002 | Takeo | 370/335 |
| 6,782,429 | B1 * | 8/2004 | Kisor | 709/241 |
| 6,879,572 | B1 * | 4/2005 | Ayyagari et al. | 370/335 |
| 6,920,118 | B2 * | 7/2005 | Lozano | 370/329 |
| 2002/0081977 | A1 * | 6/2002 | McCune, Jr. | 455/67.1 |
| 2002/0131388 | A1 | 9/2002 | Ami et al. | |
| 2002/0191722 | A1 | 12/2002 | Naruse | |
| 2003/0112784 | A1 * | 6/2003 | Lohtia et al. | 370/342 |
| 2003/0165148 | A1 * | 9/2003 | Bishard | 370/412 |
| 2004/0004973 | A1 * | 1/2004 | Lee | 370/445 |
| 2004/0023660 | A1 * | 2/2004 | Ben-Eli | 455/450 |
| 2004/0125797 | A1 * | 7/2004 | Raisanen | 370/389 |
| 2004/0233903 | A1 * | 11/2004 | Samaras et al. | 370/389 |

FOREIGN PATENT DOCUMENTS

EP  1 133 095 A1  9/2001

(Continued)

OTHER PUBLICATIONS

English-language translation of Notification of Reasons for Rejection, issued by the Japanese Patent Office, mailed Feb. 8, 2005, for Japanese Patent Application No. 2003-065410.

Notification of Reasons for Rejection mailed May 31, 2005, by the Japanese Patent Office, in Japanese Patent Application No. 2003-065410.

(Continued)

*Primary Examiner*—Ricky Ngo
*Assistant Examiner*—Wei-Po Kao
(74) *Attorney, Agent, or Firm*—Finnegan, Henderson, Farabow, Garrett & Dunner, L.L.P.

(57) ABSTRACT

An electronic apparatus executes communication with an external device. The electronic apparatus includes an encoder that encodes source data to generate transmission data, a communication device that transmits the transmission data generated by the encoder to the external device, a unit that determines the quality with which the source data is to be transmitted, in accordance with the type of the source data, and a unit that controls the encoder to vary an amount of the generated transmission data on the basis of the determined quality.

12 Claims, 6 Drawing Sheets

FOREIGN PATENT DOCUMENTS

| | | |
|---|---|---|
| JP | 7-222245 | 8/1995 |
| JP | 2002-112383 | 4/2002 |
| JP | 2002-288073 | 10/2002 |
| JP | 2002-290974 | 10/2002 |
| JP | 2002-344941 | 11/2002 |

OTHER PUBLICATIONS

Communication dated Dec. 19, 2007 from the European Patent Office transmitting European Search Report for European Patent Application No. 04005002.3.

* cited by examiner

| TYPE OF AUDIO (S) | DRIVE/INTERNET | QUALITY |
|---|---|---|
| 1 | HDD | × |
| 2 | CD/DVD DRIVE | ○ |
| 3 | INTERNET (HIGH-SPEED) | ○ |
| 4 | INTERNET (LOW-SPEED) | × |
| 5 | NON-DEFINED | ○ |

ELECTRONIC APPARATUS WITH COMMUNICATION DEVICE

CROSS-REFERENCE TO RELATED APPLICATIONS

This application is based upon and claims the benefit of priority from prior Japanese Patent Application No. 2003-65410, filed Mar. 11, 2003, the entire contents of which are incorporated herein by reference.

BACKGROUND OF THE INVENTION

1. Field of the Invention

The present invention relates to an electronic apparatus capable of transmitting content such as music to an external device, and also relates to a program for controlling communication of the electronic apparatus.

2. Description of the Related Art

In recent years, attention has been paid to Bluetooth™ as a wireless communication technology. Bluetooth™ is a low-cost, low-power-consumption, short-range wireless communication technology suitable for mobile devices. Bluetooth™ is used for mutual connection of various mobile information devices owned by individual users. The devices are wirelessly connected and, compared to conventional connection by wire, the devices can be connected more freely, simply and easily.

Jpn. Pat. Appln. KOKAI Publication No. 2002-112383 discloses a system wherein music data is transmitted from an electronic device such as a music player to headphones by means of radio signals.

In order to reproduce music with high quality by headphones, it is necessary to enhance the quality relating to transmission of music data from the electronic apparatus to the headphones.

Bluetooth™ is capable of not only one-to-one communication, but also one-to-many communication. However, the wireless communication bandwidth of Bluetooth™ is narrow. If music data is always transmitted with high quality, almost all the available wireless communication bandwidth is occupied by the transmission of music data. In this case, such a problem arises that wireless communication between a device other than the headphones and the electronic apparatus is disrupted.

In addition, in a case where the quality of music source itself is low, even if the music source is transmitted with high quality using a wide communication bandwidth, an excess communication bandwidth is uselessly occupied without enhancing the quality of music reproduced from the headphones.

BRIEF SUMMARY OF THE INVENTION

According to an embodiment of the present invention, there is provided an electronic apparatus comprising: an encoder that encodes source data to generate transmission data; a communication device that transmits the transmission data generated by the encoder to an external device; means for determining a quality with which the source data is to be transmitted, in accordance with a type of the source data; and means for controlling the encoder to vary an amount of the generated transmission data on the basis of the determined quality.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
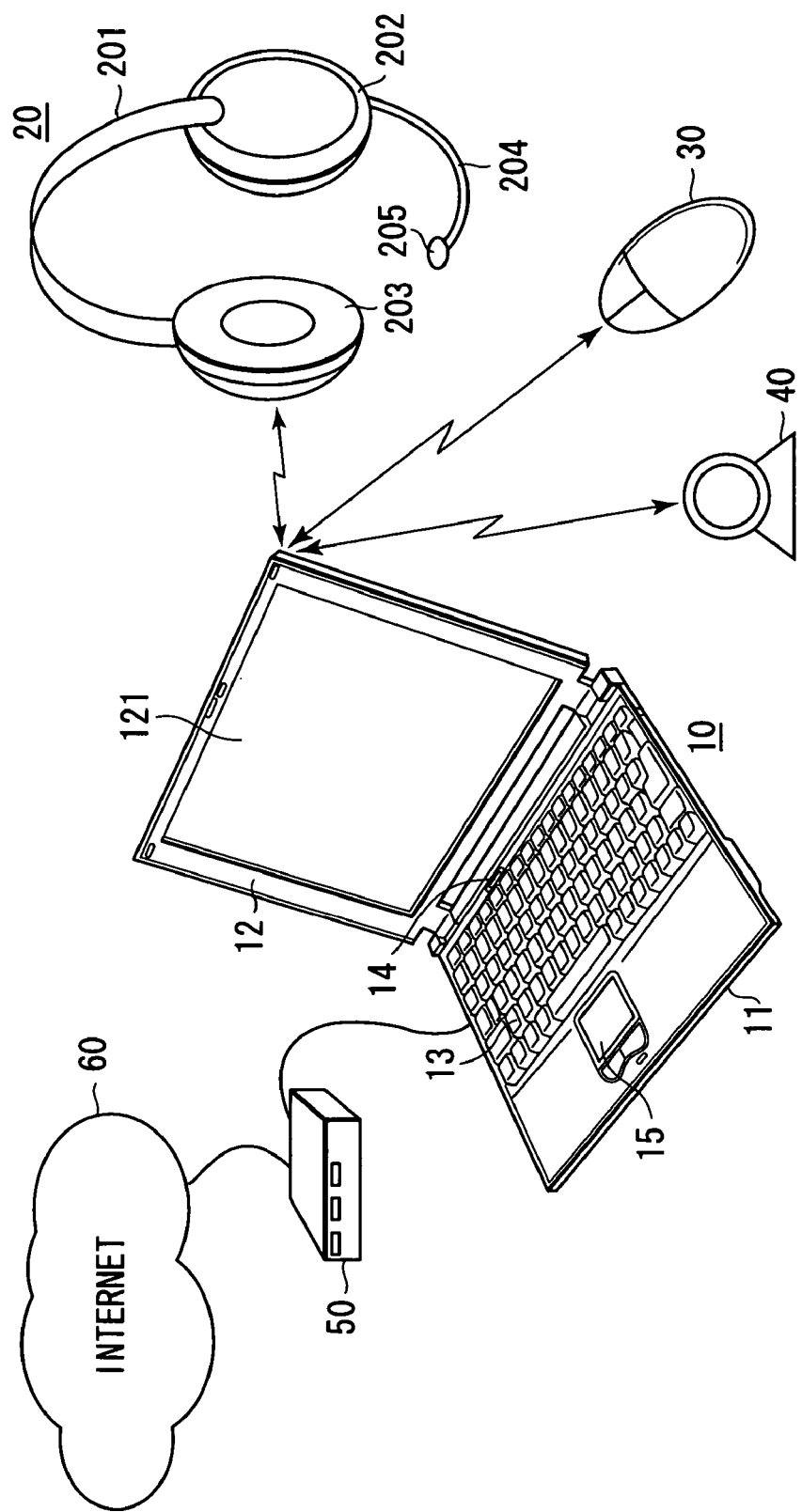
FIG. 1 shows an external appearance of a computer according to an embodiment of the present invention.

FIG. 1 shows the external appearance of an electronic apparatus 10 according to an embodiment of the invention. The electronic apparatus 10 is configured to be able to transmit a stream of content data such as music or voice to an external device 20 by radio signals. The electronic apparatus 10 is realized by, e.g. a notebook personal computer, and the external device 20 is realized by, e.g. a wireless headset.

The personal computer 10 is a portable information processing apparatus that can be driven by a battery. The personal computer 10 comprises a computer main body 11 and a display unit 12. A display device composed of an LCD (Liquid Crystal Display) 121 is built in the display unit 12. The LCD 121 is positioned at a substantially central area of the display unit 12.

The display unit 12 is attached to be rotatable between an open position and a closed position relative to the computer main body 11. The computer main body 11 has a thin box-shaped casing. A keyboard 13, a power button 14 for powering on/off the computer 10, a touch pad (pointing device) 15, etc. are disposed on the upper surface of the computer main body 11.

A wireless communication device is built in the computer main body 11. The wireless communication device enables the computer 10 to perform communication with the headset 20. The wireless communication device is configured to execute wireless communication according to Bluetooth™ standards.

In Bluetooth™, SS-FH (spread spectrum-frequency hopping) is used. 79 frequency channels are assigned to a frequency band of 2.4 GHz at intervals of 1 MHz. Frequency channels that are used are switched in units of a packet according to a hopping sequence ("frequency hopping").

Wireless communication by Bluetooth™ standards is realized by a master-slave configuration, and the master manages the hopping sequence. Using the same hopping pattern, a wireless network called "piconet" can be formed between one master and seven or less slaves.

The computer 10 can perform, using the wireless network, communication with a mouse 30 and a camera 40 as well as with the headset 20.

A connection control program, which is a program for controlling wireless communication with the headset 20, is installed in the computer 10. The connection control program controls transmission of audio data such as music from the computer 10 to the headset 20.

In Bluetooth™, Advanced Audio Distribution Profile (A2DP) is specified as a profile relating to transmission of audio data. A2DP is a function for transmitting audio data such as music with high quality. In A2DP, an asynchronous data channel called ACL (Asynchronous Connectionless) is utilized.

The connection control program controls the wireless communication device, thereby executing a procedure for transmitting audio data to the headset 20 using A2DP. Not only various audio data stored as music data files in the computer 10 but also various audio data received from the Internet 60 via a modem 50 can be used as source data of audio that is to be reproduced by the headset 20.

The connection control program has a function of dynamically varying the quality, with which source data is to be transmitted, in accordance with the type of the source data that is to be reproduced by the headset 20. The source data is converted to transmission data having a predetermined transmission data format, and the transmission data is transmitted as an audio stream from the computer 10 to the headset 20. The transmission data is generated by encoding the source data by an encoder provided in the computer 10.

The quality relating to the transmission of source data becomes higher as the amount of transmission data generated from the source data increases. The connection control program controls the operation of the encoder, thereby varying the quality relating to the transmission of source data. The generated transmission data is sent from the computer 10 to headset 20 as an audio stream.

The headset 20 is an output device that reproduces an audio stream of music, voice, etc., which is sent from the computer 10 by radio, and generates sound corresponding to the audio data of the audio stream. In the headset 20, the audio stream sent from the computer 10 is decoded and the decoded audio stream is reproduced.

The headset has a microphone 205. A signal of voice of the user, which is input from the microphone 25, is transmitted by radio to the computer 10.

The headset 20 is configured to be wearable on the head of the user. The headset 20, as shown in FIG. 1, comprises a head arm 201, and two ear pads 202 and 203 provided at both ends of the head arm 201. Each ear pad 202, 203 incorporates a speaker. Each ear pad 202, 203 functions as a speaker unit.

In the state in which the headset 20 is worn on the head of the user, the two ear pads 202 and 203 cover the right and left ears of the user. One end of a microphone arm 204 is attached to the pad 202, and the other end thereof is provided with the microphone 205.

Figure 2:
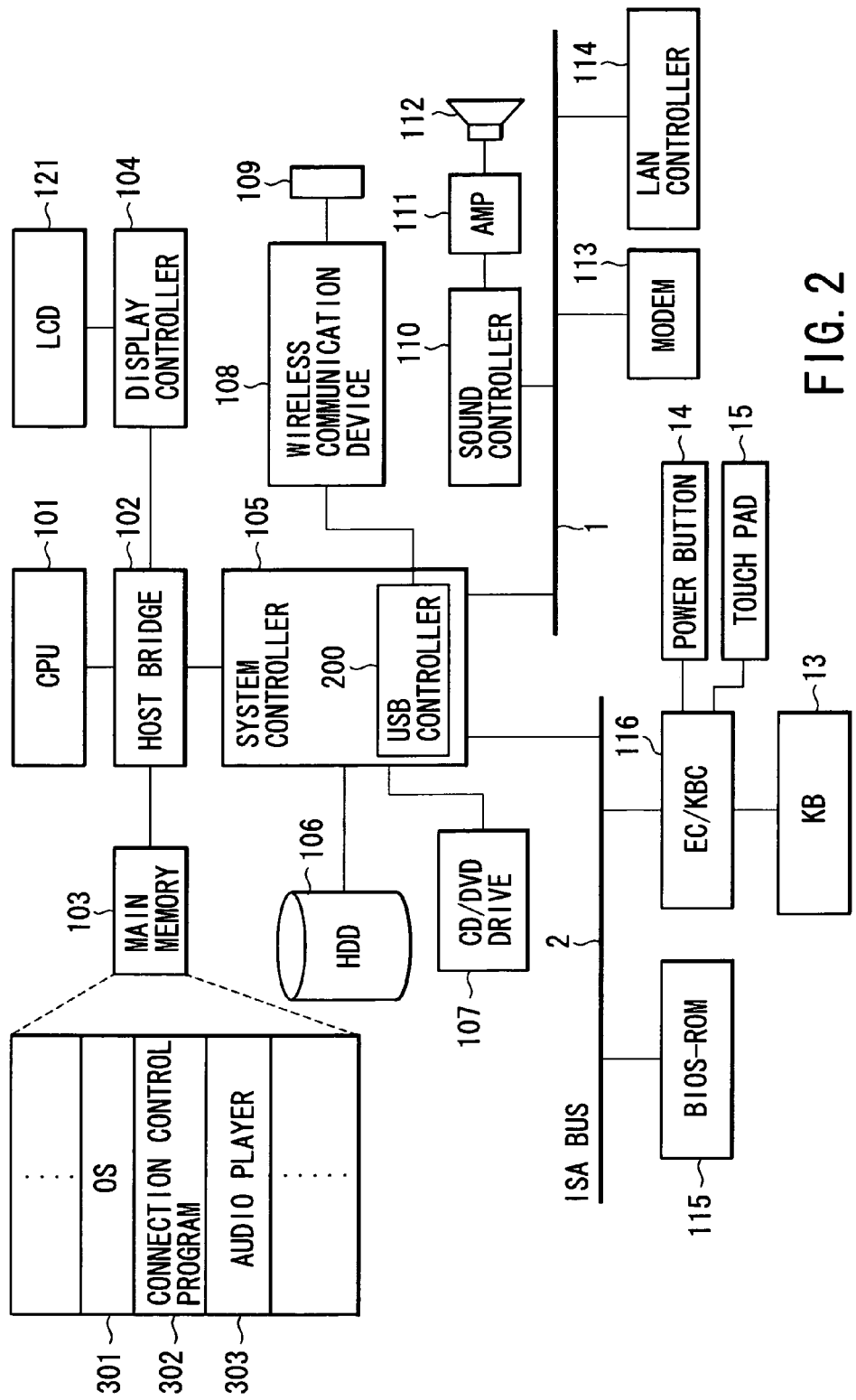
FIG. 2 is a block diagram showing the system configuration of the computer of FIG. 1.

Next, the system configuration of the computer 10 is described referring to FIG. 2.

The computer 10, as shown in FIG. 2, comprises a CPU 101, a host bridge 102, a main memory 103, a display controller 104, a system controller 105, a hard disk drive (HDD) 106, a CD/DVD drive 107, a wireless communication device 108, a sound controller 110, an audio amplifier 111, a speaker 112, a modem 113, a LAN controller 114, a BIOS-ROM 115, and an embedded controller/keyboard controller IC (EC/KBC) 116.

The CPU 101 is a processor provided to control the operations of the computer 10. The CPU 101 executes an operating system (OS) 301 and various application/utility programs, which are loaded in the main memory 103 from the hard disk drive (HDD) 106. The CPU 101 also executes a BIOS (Basic Input/Output System) stored in the BIOS-ROM 115.

In the computer 10, the aforementioned connection control program 302 is pre-installed as one of the utility programs. In addition, an audio player 303 is installed as an application program for reproducing audio data.

Figures 3, 4:
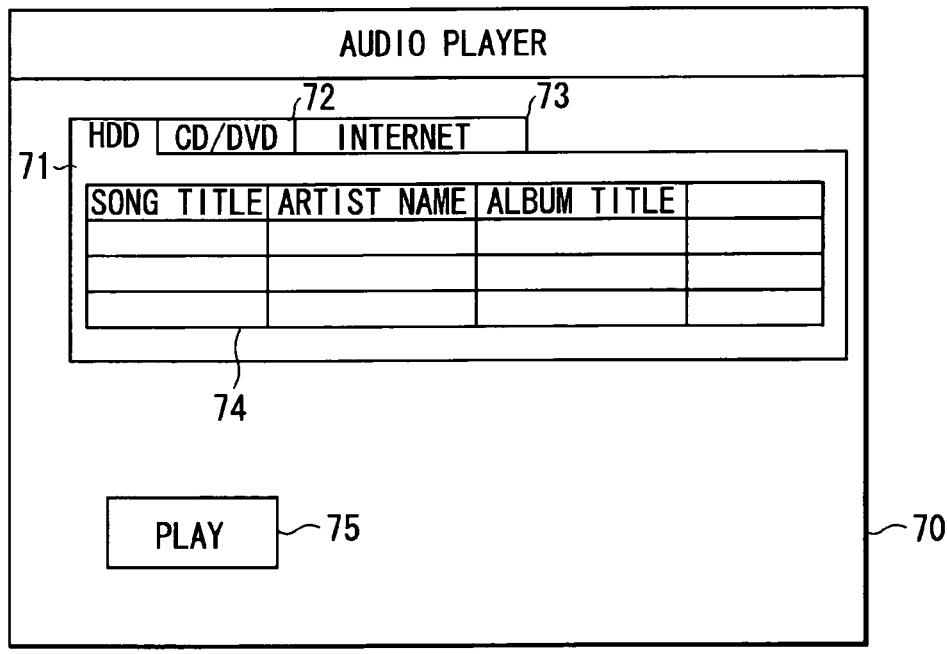
FIG. 3 shows an example of a quality definition table for use in the computer of FIG. 1.
FIG. 4 shows an example of an operation screen of an audio player that is used in the computer of FIG. 1.

Using a quality definition table 300 as shown in FIG. 3, the connection control program 302 determines an optimal transmission quality that is suited to source data to be reproduced. The quality definition table 300 prestores definition information indicative of whether high-quality transmission is necessary or not in association with each type (S=1 to 5) of source data. In the quality definition table 300 shown in FIG. 3, "○" designates source data requiring high-quality transmission, and "X" designates source data requiring only low-quality transmission. The value (S) is used as an index for searching the quality definition table 300.

In the present embodiment, the type of source data is classified according to the type of input device (disk drives and Internet-connection communication devices) that inputs source data to be reproduced by the headset 20.

Normally, audio data stored in storage media such as CDs/DVDs is high-quality data that is specifically used for music, which is sampled at a high sampling frequency. On the other hand, the quality of audio data stored in the HDD is, in many cases, not so high. Thus, the connection control program 302 classifies the type of source data according to the type of disk drive in which the source data to be reproduced by the headset 20 is stored.

In addition, in the case where audio data such as music data, which is present on Web sites on the Internet 60, is used as source data, the connection control program 302 classifies the type of the source data (data requiring high-quality transmission or data requiring only low-quality transmission) according to whether the communication line for connection to the Internet 60 is a broadband high-speed line or a narrow-band low-speed line.

In this way, in accordance with the type of input device for inputting source data, the optimal transmission quality for the source data is determined.

In practice, in order to prevent adverse effect on communication between the computer 10 and a device other than the headset 20, the connection control program 302 determines the quality with which source data is to be transmitted, taking into account not only the type of the source data to be sent to the headset 20, but also the number of devices (number of links) currently wirelessly connected to the computer 10 and the establishment/non-establishment of the link with the camera 40.

If high-quality transmission of audio data to the headset 20 is started in the state in which video data such as motion video is being transmitted from the camera 40 to the computer 10, faults such as halt of video data transmission or halt of audio data transmission may occur. In the present embodiment, when the number of links is relatively large or when the link between the camera 40 and computer 10 is established, the transmission quality of audio data is set at a low level.

In FIG. 2, the host bridge 102 is a bridge device that connects the local bus of the CPU 101 and the system controller 105. The host bridge 102 includes a memory controller that controls access to the main memory 103. The display controller 104 controls the LCD 121 that is used as a display monitor of the computer 10.

The system controller 105 controls each device on a PCI (Peripheral Component Interconnect) bus 1 and each device on an ISA (Industry Standard Architecture) bus 2. The system controller 105 includes an IDE (Integrated Drive Electronics) controller for controlling the HDD 106 and CD/DVD drive 107. The system controller 105 also includes a USB (Universal Serial Bus) controller 200. The wireless communication device 108 is connected to the USB controller 200.

The wireless communication device 108 is a device for executing wireless communication and includes a baseband unit and an RF (Radio Frequency) unit. The RF unit performs transmission/reception of a radio signal via an antenna (ANT) 109. The wireless communication device 108 is configured to execute wireless communication according to Bluetooth™ standards.

The sound controller 110 is a device for reproducing audio data. An audio signal output from the sound controller 110 is delivered to the speaker 112 via the audio amplifier (AMP) 111. The speaker 112 produces the audio signal as sound. The modem 113 and LAN controller 114 are wired communication devices capable of communicating with the Internet 60. The modem 113 is used to connect the computer 10 to the Internet 60 via a narrowband low-speed communication line such as a telephone line. The LAN controller 114 is used to connect the computer 10 to the Internet 60 via a broadband high-speed communication line such as an xDSL or CATV. The LAN controller 114 is connected to the xDSL or CATV via the modem 50 designed for the xDSL or CATV.

The embedded controller/keyboard controller IC (EC/KBC) 116 is a one-chip microcomputer in which an embedded controller for power management and a keyboard controller for controlling the keyboard (KB) 13 and touch pad 15 are integrated. The keyboard (KB) 13 and touch pad 15 are user interface units that can be operated by the user. In addition, the embedded controller/keyboard controller IC (EC/KBC) 116 has a function of powering on/off the computer 10 in accordance with the operation of the power button 14 by the user.

FIG. 4 shows an example of an operation screen 70 that is displayed on the LCD 121 by the audio player 303.

The operation screen 70 is a window that prompts the user to select audio data to be reproduced. The operation screen 70 contains an [HDD] tab 71, a [CD/DVD] tab 72, an [INTERNET] tab 73, and a [PLAY] button 75.

If the user clicks the [HDD] tab 71, a source data list 74 that presents audio data items stored in the HDD 106 is displayed. The source data list 74 displays the song title, artist name, and album title for each of audio data. The user can select audio data to be reproduced, from the source data list 74. Similarly, when the user clicks the [CD/DVD] tab 72, a source data list that presents audio data items stored in the CD/DVD drive 107 is displayed. When the user clicks the [INTERNET] tab 73, a source data list that presents audio data items stored on a specific Web site on the Internet 60 is displayed.

When the [PLAY] button 75 is clicked, the audio player 303 starts reproduction of audio data selected from the source data list. The connection control program 302 cooperates with the audio player 303 and executes a process for transmitting a stream of the selected audio data to the headset 20 with a transmission quality corresponding to the type of the selected audio data.

Figure 5:
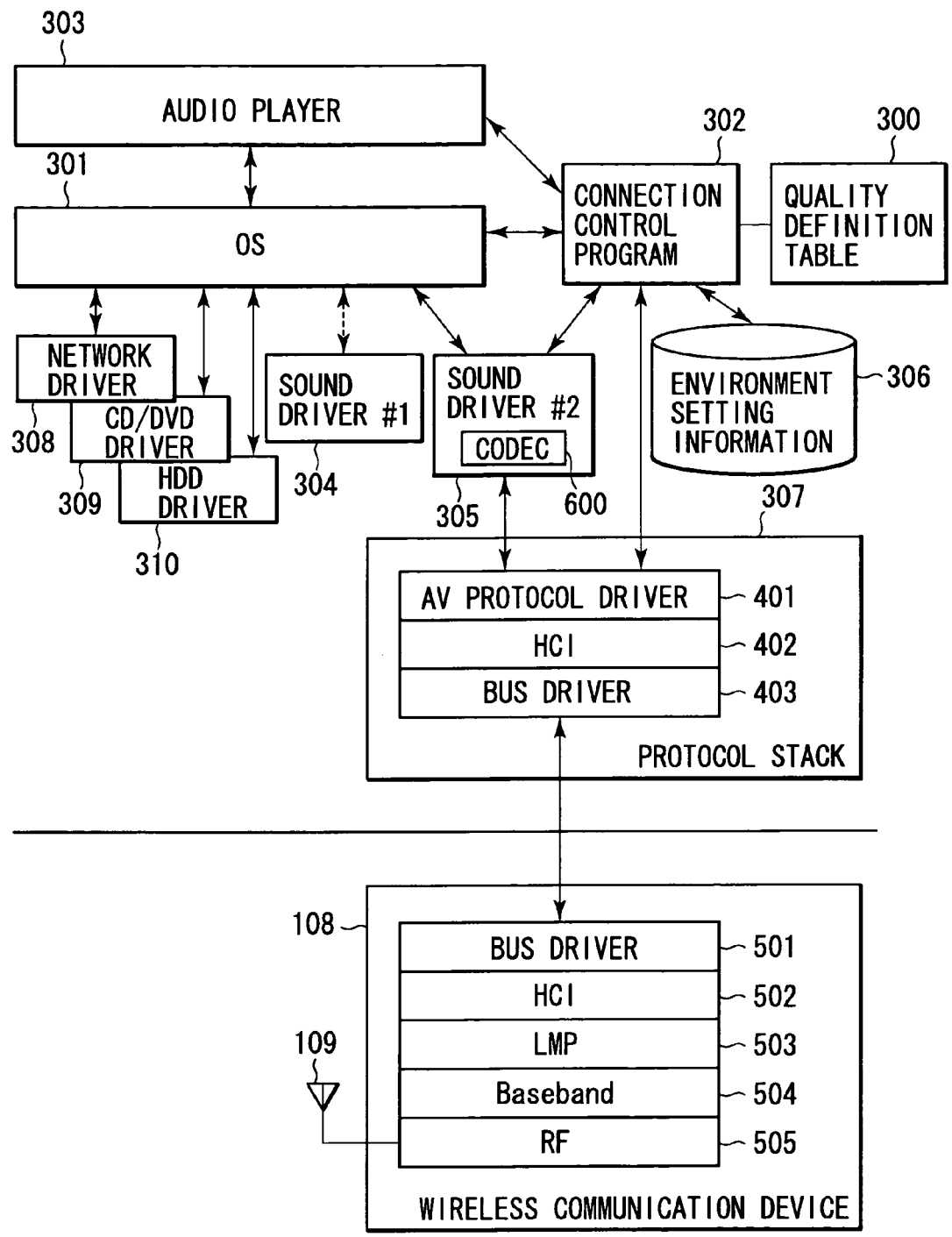
FIG. 5 is a block diagram showing the software scheme of the computer of FIG. 1.

The scheme of software for controlling the wireless communication device 108 is described referring to FIG. 5.

The wireless communication device 108 comprises a hardware logic (baseband unit 504 and RF unit 505) and firmware for controlling the hardware logic. The firmware includes a BUS driver 501, an HCI (Host Control Interface) driver 502, and an LMP (Link Management Protocol) 503. The BUS driver 501 is a driver for connecting the wireless communication device 108 to a bus such as a USB. The HCI driver 502 is a driver for communication with the host (computer 10) via the BUS driver 501. The LMP 503 is a driver for controlling a physical wireless link.

As programs for controlling the wireless communication device 108, protocol drivers 307 that constitute a protocol stack, as well as the aforementioned connection control program 302, are installed in the computer 10.

The protocol drivers 307 include an AV (audio/video) protocol driver 401 for executing an A2DP function, an HCI driver 402 for executing communication with the wireless communication device 108, and a BUS driver 403 for controlling the bus such as a USB, to which the wireless communication device 108 is connected.

The connection control program 302 controls the wireless communication device 108 via the protocol drivers 307, thereby controlling transmission of an audio data stream between the headset 20 and computer 10. The connection control program 302 can acquire, through the operating system (OS) 301 or audio player 303, information indicative of the type of the input device for inputting source data to be reproduced (i.e. the type of disk drive in which the source data is stored, or the type of communication device for receiving the source data from the Internet). The connection control program 302 determines the transmission quality of source data in accordance with the type of input device, by referring to the quality definition table 300.

In the connection establishing process for streaming, the connection control program 302 sets communication conditions associated with the determined transmission quality in the computer 10 and headset 20 in accordance with the content of an environment setting information file 306.

The setting of the communication conditions is executed using predetermined parameter information associated with the high-quality transmission and low-quality transmission. The parameter information is information for controlling the data amount of transmission data to be generated, and it includes various parameter values such as the kind of CODEC (COmpression/DECompression) to be applied to source data that is to be transmitted, and the value of sampling frequency used in the CODEC.

The parameter indicative of the kind of CODEC designates a compression-encoding scheme by which the source data to be transmitted is compressed and encoded. This parameter is set in an encoder provided in the computer 10 and in a decoder provided in the headset 20. The parameter indicative of the value of sampling frequency designates a sampling frequency with which source data to be transmitted should be sampled in the encoding of the source data. This parameter, too, is set in the encoder provided in the computer 10 and in the decoder provided in the headset 20.

The environment setting information file 306 prestores parameter information corresponding to the communication conditions for realizing high-quality transmission (e.g. the kind of compression-encoding scheme applied to source data, and the value of sampling frequency), and parameter information corresponding to the communication conditions for realizing low-quality transmission (e.g. the kind of compression-encoding scheme applied to source data, and the value of sampling frequency).

In the high-quality streaming, for example, low-compression SBC (Subband Codec) is used. SBC is a compression-encoding/decoding scheme for music data, and a relatively large amount of arithmetic operations are needed for the processing of SBC. SBC, however, realizes sound reproduction with a sufficiently high quality on the receiving side.

In the low-quality streaming, SBC or μ-law is used. The value of sampling frequency used in SBC in the low-quality streaming is lower than the value of sampling frequency used in SBC in the high-quality streaming.

As has been described above, the parameter values such as the kind of CODEC and the sampling frequency are varied according to the quality with which the source data is to be transmitted. As a result, the data amount of transmission data (the bit rate of transmission data), which is generated from the source data, is changed. Accordingly, the wireless communication bandwidth required for transmitting source data is varied in accordance with the type of the source data.

A network driver 308 is a driver program for controlling the modem 113 or LAN controller 114 under control of the OS 301. Audio data, which is transferred by streaming from a Web site on the Internet 60, is sent to the audio player 303 via the network driver 308 and OS 301. A CD/DVD driver 309 is a driver program for controlling the CD/DVD drive 107 under control of the OS 301. Audio data, which is read out of the CD/DVD drive 107, is sent to the audio player 303 via the CD/DVD driver 309 and OS 301. An HDD driver 310 is a driver program for controlling the HDD 106 under control of the OS 301. Audio data, which is read out of the HDD 106, is sent to the audio player 303 via the HDD driver 310 and OS 301.

Audio data reproduced by the audio player 303 is delivered to a first sound driver 304 or a second sound driver 305 via the OS 301. The first sound driver 304 is a driver for controlling the sound controller 110. The first sound driver 304 is used to produce sound from the built-in speaker 112 via the sound controller 110. The second sound driver 305 is a driver for transmitting audio data to the wireless communication device 108 via the protocol drivers 307.

The connection control program 302 loads the second sound driver 305 in the main memory 103, thereby to send audio data to the headset 20 by radio. The second sound driver 305 has a higher priority than the first sound driver 304.

After the second sound driver 305 is loaded, the second sound driver 305, in place of the first sound driver 304, is used by the OS 301. Accordingly, audio data reproduced by the audio player 303 is sent to the second sound driver 305 as source data to be reproduced by the headset 20.

The second sound driver 305 has a CODEC 600 associated with both SBC and μ-law. The CODEC 600 includes an encoder, which encodes source data using SBC or μ-law and generates transmission data, and a decoder that decodes transmission data using SBC and μ-law.

The second sound driver 305 encodes source data (audio data) to be transmitted, using a compression-encoding scheme designated by the connection control program 302. The value of sampling frequency used in the compression-encoding process is also designated by the connection control program 302. By the encoding process, the source data is converted to transmission data.

Figure 6:
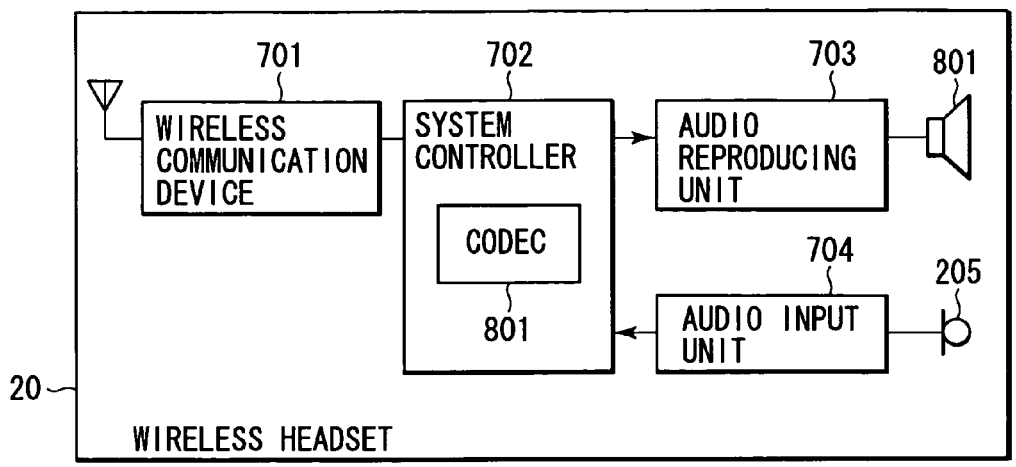
FIG. 6 is a block diagram showing a system configuration of a headset that is wirelessly connected to the computer of FIG. 1.

Referring now to FIG. 6, the system configuration of the headset 20 is described.

The headset 20, as shown in FIG. 6, comprises a wireless communication device 701, a system controller 702, an audio reproducing unit 703, and an audio input unit 704.

The system controller 702 is a processor provided to control the operations of the headset 20. The system controller 702 controls the wireless communication device 701, audio reproducing unit 703 and audio input unit 704. The system controller 702 includes a CODEC 801 associated with both SBC and μ-law. The CODEC 801 includes a decoder that decodes transmission data received as an audio stream, using SBC and μ-law, and an encoder that encodes an input voice signal from the microphone 205, using SBC and μ-law, and generates transmission data.

The wireless communication device 701, like the wireless communication device 108 of computer 10, executes wireless communication on the basis of a procedure according to Bluetooth™ standards.

The audio reproducing unit 703 executes a data reproduction process for streaming reproduction. That is, in this process, while receiving an audio data stream sent from the computer 10 via the wireless communication device 701 and system controller 702, the audio reproducing unit 703 converts the audio data stream to an electric signal that can be output as sound from a speaker 206 built in each pad 202, 203. The audio input unit 704 converts an analog voice signal input from the microphone 205 to a digital signal, and delivers it to the system controller 702.

Figure 7:
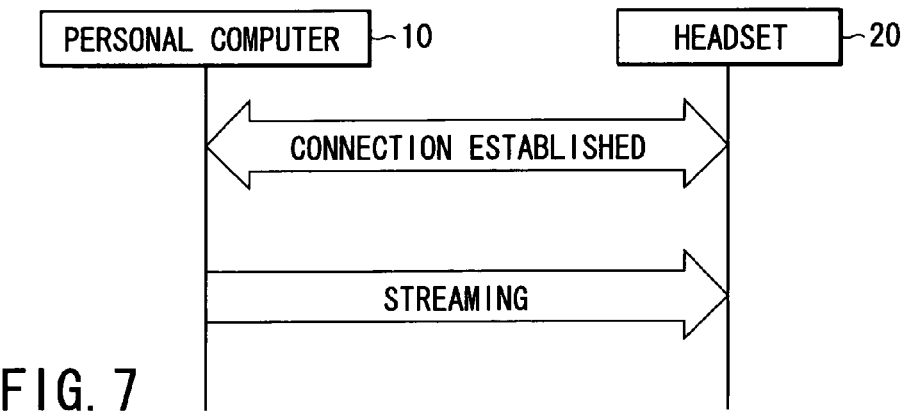
FIG. 7 illustrates a connection establishing process that is executed by the computer of FIG. 1.

FIG. 7 illustrates a connection establishing process that is executed by the connection control program 302.

The connection control program 302 controls the wireless communication device 108 of the computer 10, thereby starting the connection establishing process. In the connection establishing process, a procedure is executed for establishing a channel (transport channel) for transmitting audio data such as music from the computer 10 to the headset 20.

In the connection establishing process, the connection control program 302 sets communication conditions, which correspond to the transmission quality determined according to the type of source data, in both the computer 10 and headset 20 that are to function as stream end points of the transport channel. In this case, in practice, the connection control program 302 detects the capability of the headset 20 by executing negotiation with the headset 20. Based on the detected capability of the headset 20 and the communication conditions corresponding to the determined transmission quality, the connection control program 302 determines optimal communication conditions that are to be actually used in the data streaming between the computer 10 and headset 20, and sets the optimal communication conditions in the CODEC 600 of computer 10 and the CODEC 801 of headset 20.

The computer 10 functions as a source device for transmitting audio data via the established transport channel. The headset 20 functions as a sink device for receiving audio data that is transmitted via the established transport channel. Following the connection establishing process, a process (streaming) for transmitting audio data from the computer 10 to the headset 20 is started.

Figure 8:
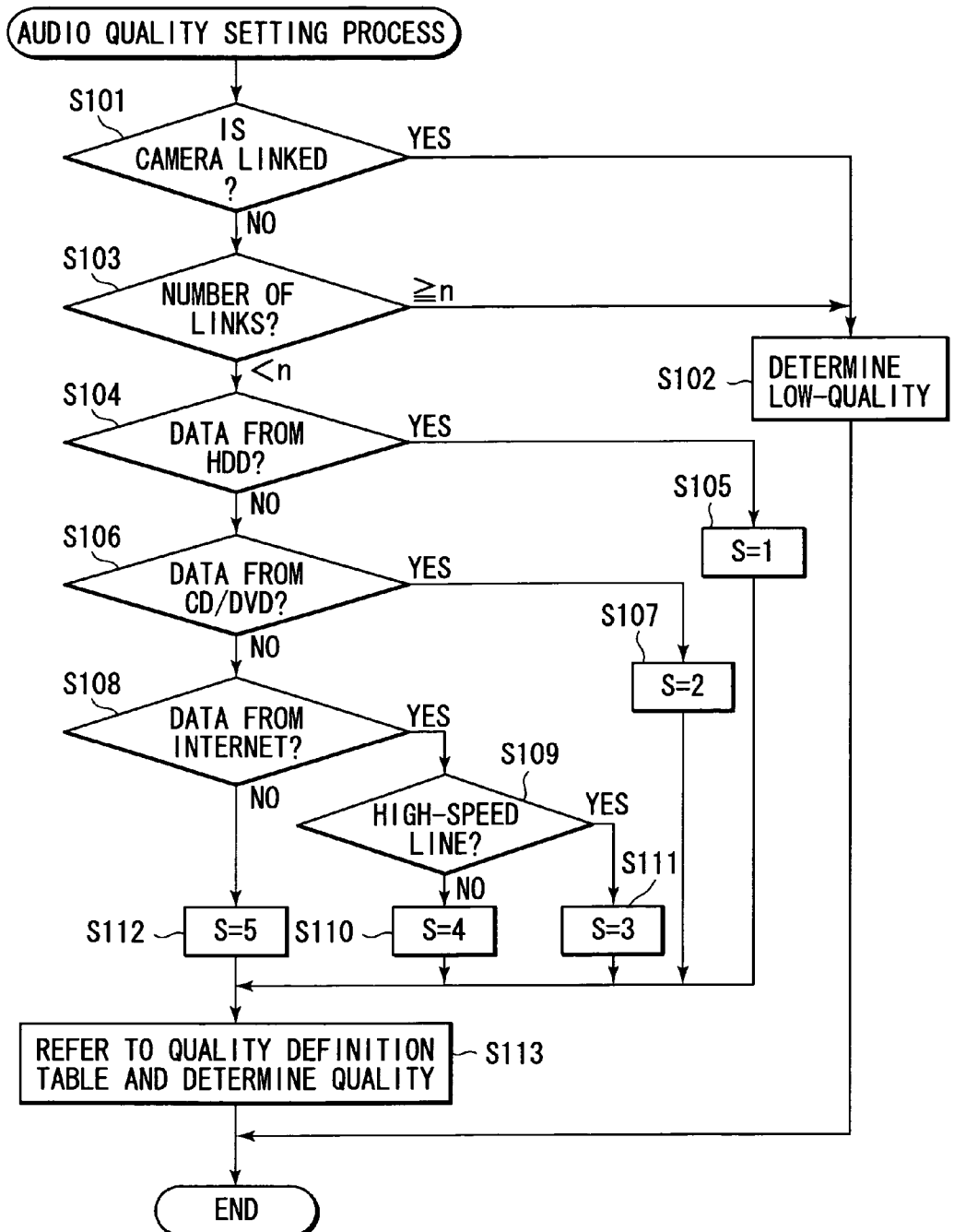
FIG. 8 is a flow chart illustrating the procedure of a transmission quality determination process that is executed by the computer of FIG. 1.

The procedure of a transmission quality determination process that is executed by the connection control program 302 will now be described with reference to a flow chart of FIG. 8.

The connection control program 302 executes the following transmission quality determination, for example, when the [PLAY] button 75 on the operation screen 70 shown in FIG. 4 is clicked.

To start with, the connection control program 302 determines whether the camera 40 is wirelessly connected to the computer 10, that is, whether a link between the wireless communication device 108 and camera 40 is established (step S101). If the camera 40 is wirelessly connected to the computer 10 (YES in step S101), the connection control program 302 determines a low quality as the quality for transmission of audio data to be reproduced, which is selected on the operation screen 70 (step S102). Thus, the transmission of image data such as moving image between the camera 40 and the computer 10 is executed with priority over transmission of the audio data from the computer 10 to the headset 20.

If the camera 40 is not wirelessly connected to the computer 10 (NO in step S101), the connection control program 302 determines whether the number of devices (number of links) currently wirelessly connected to the computer 10 is a predetermined number (n) or more (step S103). If the number of links is n or more, the connection control program 302 determines a low quality as the quality for transmission of audio data to be reproduced (step S102). The default value of n is, e.g. 3. The value n can be varied by the user.

If the number of links is less than n, the connection control program 302 detects the type of audio data to be reproduced, that is, the type of input device used for inputting audio data to be reproduced.

Specifically, the connection control program 302 determines whether the audio data to be reproduced is audio data stored in the HDD 106 (step S104). If the audio data to be reproduced is the data stored in the HDD 106 (YES in step S104), the connection control program 302 sets S=1 (step S105). If the audio data to be reproduced is not data stored in the HDD 106 (NO in step S104), the connection control program 302 determines whether the audio data to be reproduced is audio data stored in the CD/DVD drive 107 (step S106).

If the audio data to be reproduced is the audio data stored in the CD/DVD drive 107 (YES in step S106), the connection control program 302 sets S=2 (step S107). If the audio data to be reproduced is not data stored in the CD/DVD drive 107 (NO in step S106), the connection control program 302 determines whether the audio data to be reproduced is audio data stored on a Web site on the Internet 60 (step S108). If the audio data to be reproduced is audio data stored on the Web site on the Internet 60, that is, audio data transferred from the Internet 60 (YES in step S108), the connection control program 302 asks the OS 301 whether the communication device currently used for connection to the Internet 60 is the modem 113 or LAN controller 114, thereby determining whether the communication line currently used for connection to the Internet 60 is a high-speed line (step S109). If the communication line is the high-speed line (YES in step S109), the connection control program 302 sets S=3 (step S111). If the communication line is a low-speed line (NO in step S109), the connection control program 302 sets S=4 (step S110).

If the audio data to be reproduced is not data transferred from the Internet 60 (NO in step S108), the connection control program 302 sets S=5 (step S112).

Then, the connection control program 302 searches the quality definition table 300 using the set value S as an index, thereby determining the quality with which the audio data to be reproduced is to be transmitted (step S113).

Figure 9:
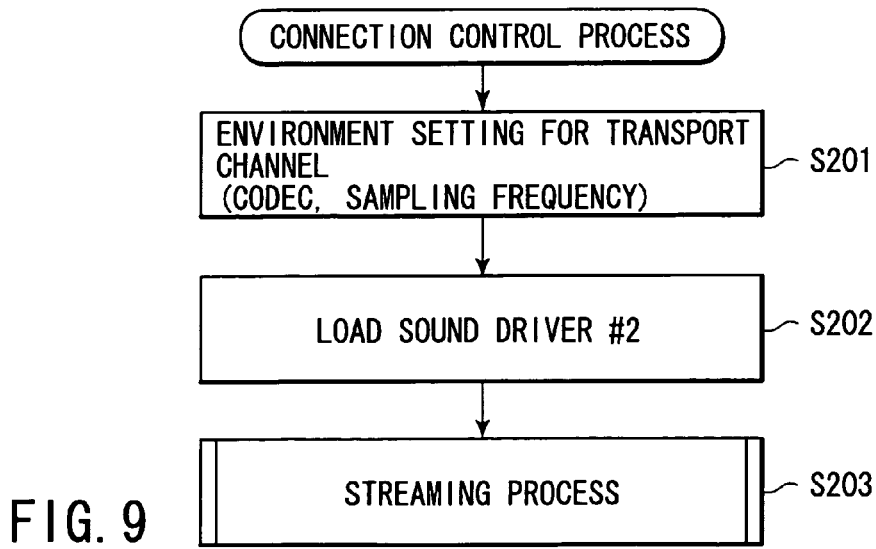
FIG. 9 is a flow chart illustrating the procedure of a connection control process that is executed by the computer of FIG. 1.

Next, a connection control process that is executed by the connection control program 302 is described with reference to a flow chart of FIG. 9.

After determining the quality with which the to-be-reproduced audio data is to be transmitted, the connection control program 302 executes the following connection control process in order to establish the transport channel for transmitting audio data from the computer 10 to the headset 20 with the determined quality.

In order to set a communication environment for wirelessly transmitting audio data to the headset 20 with the determined quality, the connection control program 302 starts the connection establishing process. In the connection establishing process, the connection control program 302 sets communication conditions (the kind of CODEC and the value of sampling frequency), which correspond to the quality determined by the process of FIG. 8, in the computer 10 and headset 20 that are to function as stream end points of the transfer channel (step S201). Specifically, the parameter information including the kind of CODEC and the value of sampling frequency is set in the CODEC 600 of the computer 10 and in the CODEC 801 of the headset 20. The setting of the communication conditions is effected via a control channel that is established between the computer 10 and headset 20.

The role of the sink device is assigned to the remote device, that is, the headset 20. The role of the source device is assigned to the local device, that is, the computer 10. The processing in step S201 establishes the transport channel for transmitting audio data such as music from the computer 10 to the headset 20 with the determined quality.

Then, the connection control program 302 loads the second sound driver 305 (step S202), and informs the headset 20 of the start of streaming, thus executing a streaming process (step S203). In step S203, transmission data (audio stream) is generated from source data such as music or voice by the CODEC 600, and the audio stream is wirelessly transmitted from the computer 10 to the headset 20.

As has been described above, according to the present embodiment, the transmission quality, with which source data that is to be reproduced by the headset 20 is to be transmitted, is automatically optimized according to the kind of the source data. Therefore, the source data to be reproduced, such as music, can efficiently be wirelessly transmitted, without occupying the entirety of the wireless communication bandwidth of Bluetooth™. Moreover, the quality for transmitting the source data is determined by also taking into account the number of links and the connection/disconnection of the camera 40. Thus, the source data to be reproduced, such as music, can be transmitted to the headset 20, without adversely affecting wireless communication between the computer 10 and a device other than the headset 20.

All the quality determination process and connection control process are realized by the computer program. Therefore, the same advantages as with the present embodiment can easily be obtained by simply installing the computer program in a computer with a wireless communication function, using a computer-readable storage medium storing this computer program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   an encoder that encodes source data to generate transmission data;
   a wireless communication device that executes communication with an external device via a wireless network, and transmits the transmission data generated by the encoder to the external device;
   means for detecting the number of devices connected to the wireless communication device via the wireless network;
   means for determining a rate at which the source data is to be transmitted, on the basis of the detected number of devices and a type of the source data, wherein when the detected number is greater than a preset value, the rate is determined lower than when the detected number is not greater than the preset value; and means for controlling the encoder to vary an amount of the generated transmission data on the basis of the determined rate of the source data.

2. The electronic apparatus according to claim 1, wherein the controlling means includes means for setting in the encoder a value of sampling frequency, which is to be used in the encoding of the source data, in accordance with the determined rate of the source data.

3. The electronic apparatus according to claim 1, wherein the controlling means includes means for setting in the encoder a kind of an encoding scheme, which is to be used in the encoding of the source data, in accordance with the determined rate of the source data.

4. The electronic apparatus according to claim 1, wherein the controlling means includes means for setting in the encoder a kind of an encoding scheme, which is to be used in the encoding of the source data, and a value of sampling frequency, which is to be used in the encoding of the source data, in accordance with the determined rate of the source data.

5. The electronic apparatus according to claim 1, further comprising a plurality of input devices capable of inputting data, wherein the rate determining means includes means for detecting the type of the source data by determining from which of the input devices the source data is input.

6. The electronic apparatus according to claim 1, wherein:

the source data includes audio data, the electronic apparatus further includes means for determining whether a device that transmits image data is connected to the wireless communication device via the wireless network, and the rate determining means includes means for setting, when the device that transmits image data is connected to the wireless communication device, the rate of the source data at a first rate which is lower than a given rate.

7. A program that is stored in a computer-readable medium and controls wireless communication for transmitting transmission data, which is generated by encoding source data, from a computer to an external device via a wireless network, comprising:

causing the computer to execute a process of detecting the number of devices connected to the computer via the wireless network;

causing the computer to determine a rate at which the source data is to be transmitted, on the basis of the detected number of devices and a type of the source data, wherein when the detected number is greater than a preset value, the rate is determined lower than when the detected number is not greater than the preset value; and causing the computer to execute a process of controlling an operation of the encoding to vary an amount of the generated transmission data on the basis of the determined rate of the source data.

8. The program according to claim 7, wherein said causing the computer to execute the process of controlling the operation of the encoding includes causing the computer to execute a process of determining a value of sampling frequency, which is to be used in the encoding process, in accordance with the determined rate of the source data.

9. The program according to claim 7, wherein said causing the computer to execute the process of controlling the operation of the encoding includes causing the computer to a process of determining a kind of an encoding scheme, which is to be used in the encoding process, in accordance with the determined rate of the source data.

10. The program according to claim 7, wherein said causing the computer to execute the process of controlling the operation of the encoding includes causing the computer to execute a process of determining a kind of an encoding scheme, which is to be used in the encoding process, and a value of sampling frequency, which is to be used in the encoding process, in accordance with the determined rate of the source data.

11. The program according to claim 7, wherein said causing the computer to determine the rate includes causing the computer to execute a process of detecting the type of the source data by determining from which of a plurality of input devices of the computer the source data is input.

12. The program according to claim 7, wherein:

the source data includes audio data, the program further includes causing the computer to execute a process of determining whether a device that transmits image data is connected to the computer via the wireless network, and said causing the computer to determine the rate includes causing the computer to execute a process of setting, when the device that transmits image data is connected to the wireless communication device, the rate of the source data at a first rate which is lower than a given rate.

* * * * *

UNITED STATES PATENT AND TRADEMARK OFFICE
CERTIFICATE OF CORRECTION

| | |
|---|---|
| PATENT NO. | : 7,460,477 B2 |
| APPLICATION NO. | : 10/795974 |
| DATED | : December 2, 2008 |
| INVENTOR(S) | : Yata et al. |

It is certified that error appears in the above-identified patent and that said Letters Patent is hereby corrected as shown below:

Claim 9, column 12, line 19, change "to a" to --to execute a--.

Signed and Sealed this

Third Day of March, 2009

JOHN DOLL
*Acting Director of the United States Patent and Trademark Office*